(12) United States Patent
Newell, Jr. et al.

(10) Patent No.: US 6,668,319 B1
(45) Date of Patent: Dec. 23, 2003

(54) METHOD AND MECHANISM FOR CORRELATING AND MATCHING MUTUALLY SUPPORTED PROTOCOL FEATURES OF SYSTEM DEVICES

(75) Inventors: Lawrence Bert Newell, Jr., Jalisco (MX); Ricardo Osuna Leyva, Boise, ID (US); Carlos F. Becerra, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/542,125

(22) Filed: Apr. 4, 2000

(51) Int. Cl.[7] .................................. G06F 1/24
(52) U.S. Cl. ............. 713/100; 370/466; 709/230; 710/11
(58) Field of Search ................ 709/221, 230; 710/11; 713/100; 370/466

(56) References Cited

U.S. PATENT DOCUMENTS

| | | | | |
|---|---|---|---|---|
| 4,953,210 A | * | 8/1990 | McGlynn et al. | 380/266 |
| 5,386,512 A | * | 1/1995 | Crisman et al. | 709/228 |
| 5,504,837 A | * | 4/1996 | Griffeth et al. | 706/10 |
| 5,621,894 A | * | 4/1997 | Menezes et al. | 709/227 |
| 5,859,979 A | * | 1/1999 | Tung et al. | 709/228 |
| 5,905,906 A | * | 5/1999 | Goffinet et al. | 710/8 |
| 6,084,859 A | * | 7/2000 | Ratcliff et al. | 370/252 |
| 6,112,256 A | * | 8/2000 | Goffinet et al. | 710/8 |
| 6,161,135 A | * | 12/2000 | Ehrlich et al. | 709/221 |
| 6,202,095 B1 | * | 3/2001 | Beardsley et al. | 709/227 |
| 6,445,716 B1 | * | 9/2002 | Favichia et al. | 370/466 |

* cited by examiner

Primary Examiner—Thomas Lee
Assistant Examiner—Albert Wang

(57) ABSTRACT

A features matching method and mechanism for use in a system wherein devices communicate through a protocol to request features to be performed by others of the devices and each device supports at least a subset of the feature set of the system. A first device stores information identifying the features supported by the first device and a match mechanism generates and transmits a declaration to second devices wherein each declaration identifies the features supported by the first device. The first device receives declarations from second devices wherein each declaration identifies the features supported by the second device and identifies the features supported in common by the first and second devices. The first device then monitors each request for a feature that is directed to a second device to determine whether the feature is supported by the second device. A second device may identify the features supported by the second device, compare the features identified in the declaration from the first device with the features identified as supported by the second device to identify the features supported in common by the first and second devices, and transmit to the first device a declaration identifying the features supported in common by the first and second devices. Alternately, the declaration from a second device may identify the features supported by the second device and the first device will determine the features supported in common by the first and second devices.

15 Claims, 2 Drawing Sheets

METHOD AND MECHANISM FOR CORRELATING AND MATCHING MUTUALLY SUPPORTED PROTOCOL FEATURES OF SYSTEM DEVICES

FIELD OF THE INVENTION

The present invention relates to a method for correlating or matching the features supported by a device with the features that may be requested by other devices communicating with that device through one or more versions of a protocol for communication between the devices.

BACKGROUND OF THE INVENTION

A common feature of contemporary computer and communications systems is that the systems are comprised of a plurality of cooperatively functioning but separate units, or devices, each of which may perform specific tasks or a range of generalized tasks. The devices are interconnected, either directly or through a network, and exchange requests for operations by means of common protocols, or communications languages, each of which is designed for inter-device communication with respect to the tasks or range of tasks performed by the devices. A given protocol will include the commands, responses and information formats necessary to support requests by a requesting device, such as a processor unit, for the execution of functions or operations by a responding device with which it is communicating, such as a printer. The functions and operations that may be performed, or supported, by a responding device are commonly referred to as the "features" of the responding device. A requesting device is correspondingly referred to as supporting a "feature" when it is capable of issuing a request for that feature of a responding device, and a protocol is referred to as supporting a "feature" when it includes the commands, responses and information formats necessary to communicate a request for that "feature" from the requesting device to the responding device, and the corresponding responses from the responding device to the requesting device.

It is commonly understood and accepted that the use of such protocols has been of significant advantage to the users and manufacturers of such systems and the devices used in such systems and the use of such protocols has become a standard practice, with many such protocols becoming industry standards. For example, a personal computer system is typically comprised of a central processing unit with an associated monitor and keyboard and one or more peripheral devices, such as printers, scanners, and modems. The central processing unit communicates with the peripheral devices to request operations, or features, that are specific to each of the peripheral devices and, in each instance, does so using a protocol that is appropriate to the type or range of features supported by each device. The use of common protocols by central processing units and peripheral devices from different sources or manufacturers has been of significant advantage to both the users of personal computers and the manufacturers of personal computers and peripheral devices in allowing the free combination of central processing units and peripherals devices from different sources and in different system configurations.

In further example, such protocols are also commonly used in larger systems comprised of one or more requesting devices, such as personal computers, workstations or shared processing units, and a number of responding devices, such as shared printers, file servers and communications servers, that are interconnected through a network and serve a number of users. In such larger systems the shared devices are typically more complex than in, for example, a personal computer system, and typically support a wider range of features, so that the protocols are correspondingly more extensive and complex. The use of such protocols, however, have provided advantages similar to those accruing in personal computer systems in allowing the free combination of devices from different sources and of different types in a wide range of system configurations.

To illustrate the uses of such protocols further, a personal computer system will commonly include one or more printers to generate printed copies of electronic documents of various types and the personal computer will communicate with the printers through a printer protocol that will typically be used in common by a range of printers from different manufacturers and having different features. In larger systems, such as a system serving a corporate department or facility, the printing facilities will be provided by a device of the type referred to as a "paper handling controller" and other devices in the system, such as servers, processors, workstations and personal computers, will communicate with the "paper handling controller" through a "paper handling protocol". In this regard, a paper handling controller may be, for example, a printer, a multi-function device such as a Hewlett-Packard Mopier, which performs the functions of a networked printer, a copier and a scanner, a printer controller connected from a network and controlling a number of individual printers to form a printer complex or node, or a facsimile device. It will be understood, therefore, that the devices and protocols appearing in a large system may be analogous to those appearing in a smaller system, the term "paper handling controller" as opposed to "printer" denotes the wider range of features that may appear in the devices of a large system and the term "paper handling protocol" denotes the expansion or extension of the protocol or protocols to accommodate the wider range of features, and the adaptations necessary for communication in a large system, networked environment. For example, in a large system, or in a more complex small system, a paper handling controller may be a printer controller having access to and controlling a complex of printers or other devices that may provide a wide range of features. The devices of the system, such as the processors, workstations or personal computers, will communicate with the paper handling controlling through a paper handling protocol supporting the range of features supported by the devices available to the paper handling controller and adapted to a networked environment. The paper handling controller will, in turn, communicate with the individual printers or other devices using the same or a similar paper handling protocol or protocols, depending upon the printers or other types of paper handling devices connected from or accessible to the paper handling controller.

The use of such protocols, however, results in certain problems in the systems and protocols of the prior art. As described, a given protocol or version of a protocol will support a given set of features that may be requested by a first device, such as a processor unit, and that are supported by a second device with which it is communicating, such as a paper handling controller. It is known and intended, however, that the features supported by the devices of a system, such as printers, will change with time as devices are added or removed or updated, so that previously supported features are no longer available or are modified while new features become available and are supported. A change in the features supported by the devices, and particularly the addition of new features or modifications to existing features, in turn requires the addition of corresponding features to the protocol or the modification of existing features of the protocol.

In the prior art, changes to protocols are implemented by the creation and distribution of updated or new versions of the protocols, or of new protocols, as required. The methods of the prior art, however, result in numerous problems because the features supported by a protocol are dependent upon and determined by the version of that protocol that is used. For example, a device that uses a particular version of a protocol because of a feature in that version of the protocol generally must, as a result, support all features of that version of the protocol to avoid errors or fault conditions in the system operation arising from requests for features that are supported by the portal but not supported by the device. In addition, if a device supports features that are not supported by the version of a protocol used by the system or a requesting device, the features supported by the device that are not supported by features of the protocol cannot be called and are unavailable. This problem is compounded yet further in that it is common for a device to make assumptions regarding requests for features, that is, to interpret requests for features, according to the version of the protocol in which the request is submitted. As such, a device may submit a request for a feature in one version of a protocol and the responding device may interpret that request according to the provisions of a different version of the protocol, resulting in an error or an undesired response to the request.

The installation of a new version of a protocol in a system, for example, to accommodate new or updated features, such as the addition of a new device having new features or the updating of a device with new or modified features, can therefore result in problems arising from mismatches between the features of the protocol and the features of the devices. For example, the installation of a new version of a protocol to accommodate or in anticipation of new or modified features may result in older features or older versions of features no longer being supported. Likewise, when a new device is added to a system or new or modified features are added to an existing device, those features will not be available to the system unless the protocol is updated accordingly.

It will therefore be appreciated that tracking and correlating the features supported by the devices of a system and the features of the protocols communicating with the devices of the system is a significant problem. It will also be appreciated that these problems are greatly compounded in systems employing a number of devices that use a common protocol as there may be differences in the features supported by the devices, depending upon what features each is intended to support or their age or update state. It will also be recognized the problem of correlating protocols with features is not limited to hardware type devices, such as printers, facsimile transceivers, network interfaces and modems, but extends to "software devices", that is, programs with which a user or other device, including another program, communicates by means of a protocol. Examples of such "software devices" may include the programs that reside in Internet servers and communicate with Internet browsers or electronic mail programs, programs residing on a system server to be shared among the system users, input/output programs or drivers that are shared or used by other programs, and so on.

The present invention provides a solution to these and other problems of the prior art.

SUMMARY OF THE INVENTION

The present invention is directed to a features matching mechanism for use in an information processing system including functional devices for performing operations of the system wherein the devices communicate through a protocol to request features to be performed by others of the devices. Each feature is an operation of the system supported by at least one version of the protocol and each device includes a functional unit supporting at least a subset of the features of the protocol and a protocol mechanism executing at least one version of the protocol for communicating requests for features and responses to requests for features between the device and others of the devices.

The feature matching mechanism includes, in a first device, a supported features table for storing information identifying the features supported by the first device and a match mechanism. The match mechanism generates and transmits a declaration to at least one second device with which the first device is to communicate using the protocol supported by the first device wherein each declaration is generated from information from the first device supported features table and identifies the features supported by the first device. The first device receives a declaration from at least one second device with which the first device, wherein each declaration from a second device identifies the features supported by the second device, and the match mechanism of the first device constructs a matching features table identifying, for each second device from which the first device has received a declaration, the features supported in common by the first device and the corresponding second device. The match mechanism of the first device then monitors each request for a feature that is directed to a second device represented in the matching features table to determine whether a feature identified in a request is supported by the second device to which the request is directed.

In one embodiment of the present invention, a declaration from a second device identifies the features supported in common by the first device and the corresponding second device. In this embodiment, a second device includes a device supported features table for storing information identifying the features supported by the second device and a match mechanism, similar to those of a first device. The match mechanism of the second device receives a declaration from a first device identifying the features supported by the first device and compares the features identified in the declaration from the first device as supported by the first device with the features identified in the second device supported features table to identify the features supported in common by the first device and the second device. The second device then transmits to the first device a declaration identifying the features supported in common by the first device and the second device.

In an alternate embodiment, wherein a declaration from a second device identifies the features supported by the second device, but not those supported in common by the first and second devices, the match mechanism of the first device determines the features supported in common by the first device and the second device by comparing the features identified in the declaration from the second device with the features identified in the first device supported features table as supported by the first device.

In a yet further embodiment, each device includes a supported features table for storing information identifying the features supported by the device and a match mechanism. The match mechanism generates and transmits a declaration to at least one other device with which the device is to communicate using the protocol supported by the device wherein each declaration is generated from information from the supported features table of the device and identifies the features supported by the device. The device will receive a reply declaration from at least one other device with which device is to communicate, wherein each reply declaration from another device identifies the features supported in common by that device and the other device. The match mechanism of the device constructs a matching features table identifying, for each other device from which the device has received a reply declaration, the features supported in common by the first device and the corresponding second device.

The device may also receive a declaration from at least one other device identifying the features supported by each of the other devices providing a declaration. The match mechanism of the device will compare the features identified in each declaration from another device as supported by the other device with the features identified in the device's supported features table to identify the features supported in common by the device and each other device from which it has received a declaration of supported features. The match mechanism of the device will then construct and transmit, to each other device from which the device has received a declaration of supported devices, a reply declaration identifying the features supported in common by the device and the corresponding other device.

DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

A. Introduction and Definitions (FIG. 1)

Figure 1:
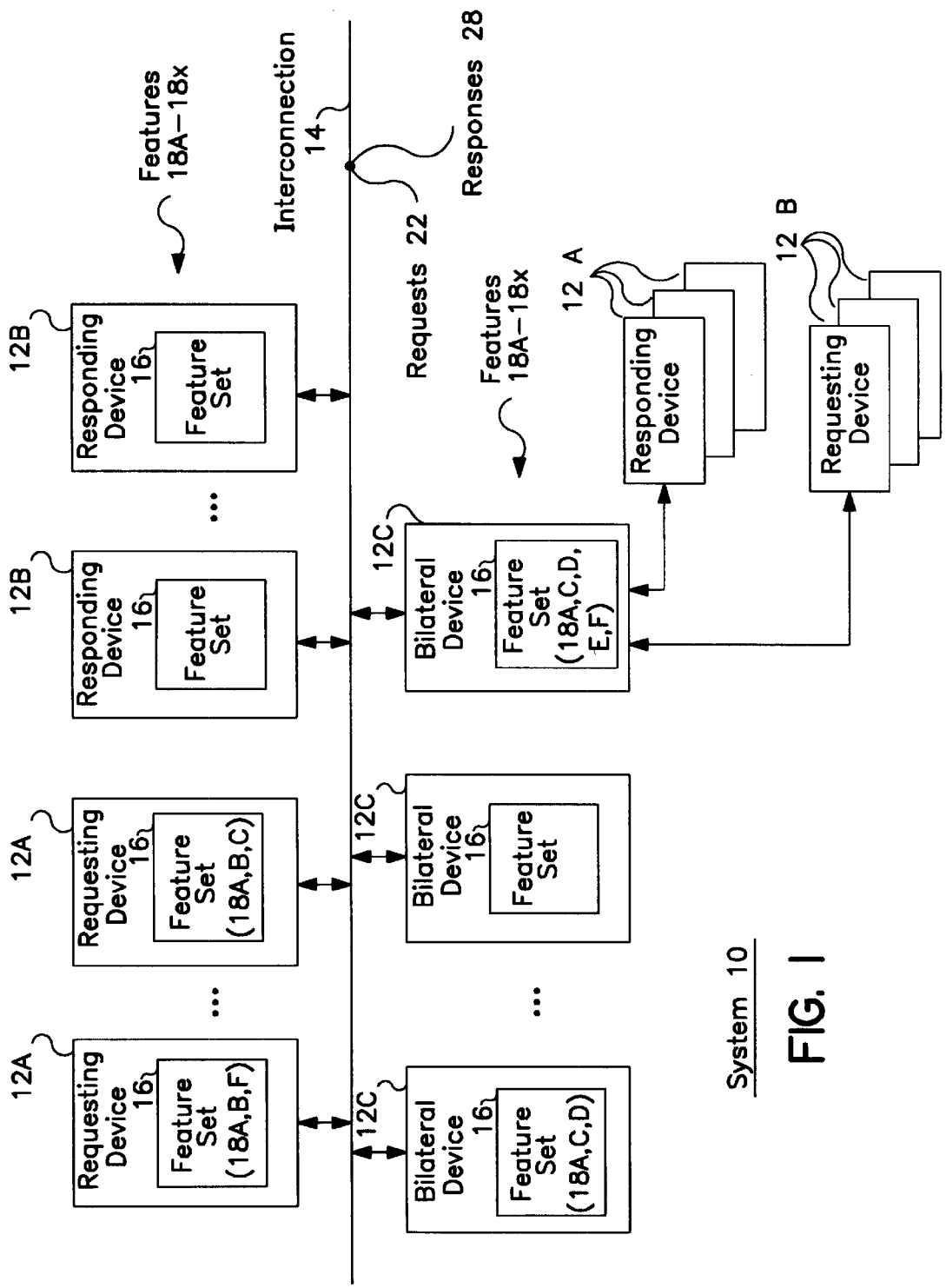
FIG. 1 is a block diagram of a system incorporating the present invention.

Referring to FIG. 1, therein is a diagrammatic representation of the present invention. As illustrated therein, an information processing System 10 will include two or more Devices 12 interconnected, for example, through a system bus or a local or wide area network, indicated generally as Interconnection 14, and communicate by means of a protocol as described herein above to request the performance of functions and operations and to respond to requests for functions and operations.

It will be noted that for purposes of the following discussions certain of Devices 12 are designated in FIG. 1 as Requesting Devices 12A while others of Devices 12 are designated as Responding Devices 12B or as Bilateral Devices 12C. For purposes of the following discussions, a Requesting Device 12A is defined as a Device 12 that is generating a request to a Responding Device 12B for features, that is, functions or operations, to be performed by the Responding Device 12B while a Responding Device 12B is correspondingly defined as a Device 12 that is responding to a request from a Requesting Device 12A by performing the requested feature. Finally, a Bilateral Device 12C is defined as a device that may function concurrently as both a Requesting Device 12A and a Responding Device 12B.

Examples of Requesting Devices 12A could include a processor, a workstation, a personal computer, or a scanner, electronic mail server or facsimile receiver forwarding documents to a printer or other recipient, while examples of Responding Devices 12B could include a printer or plotter, a printer controller controlling a complex of printers, a facsimile transmitter or printer, a file server, an electronic mail server, a shared processor, or a display of any form. Examples of Bilateral Devices 12C could include a paper handling controller such as a system print controller or server connected from a network to control a complex of printers and other paper handling devices for processors or workstations of the system, or a network interconnection node providing access between the devices of two systems. Bilateral Devices 12C include, however, all Devices 12 that are capable of both requesting features and of responding to requests for features.

In this regard, it must be understood that the above definitions and following discussion of Devices 12 as Requesting Devices 12A or as Responding Devices 12B are for purposes of clarity and understanding in the following discussions. That is, while some Devices 12 may be designed to operate solely as Requesting Devices 12A or as Responding Devices 12B, Devices 12 typically will or are capable of operating as both Requesting Devices 12A and as Responding Devices 12B, that is, as Bilateral Devices 12C as described in the following. For example, a personal computer functions as a Requesting Device 12A for purposes of requesting a file from a file server and as a Responding Device 12B when queried by the file server regarding the versions of files resident in the personal computer, while the file server respectively operates as a Responding Device 12B and as a Requesting Device 12A. In a further example, a first Device 12 that initially functions as a Responding Device 12B in response to a request from a second Device 12 which initially functions as a Requesting Device 12A may, in the course of providing the requested feature, transmit requests for other features, such as a request for further information, to the second Device 12, which then functions as a Responding Device 12B. That is, two Devices 12 may be required to reverse their respective roles as a Requesting Device 12A and as a Responding Device 12B in order to execute a requested feature, so that each Device 12 is required to function as both a Requesting Device 12A and as a Responding Device 12B.

It will also be understood that two Devices 12 that are communicating through a protocol to execute a feature may be essentially the same type of device, such as two file servers or processors, such as personal computers, exchanging or correlating files, or two Devices 12 may be a complementary or mirror devices with respect to each other, such as an Internet browser and an Internet file server. In yet other instances, the Devices 12 that are communicating through a protocol to execute a feature may be completely different types of devices, such as a printer device serving a word processing or graphic program or a facsimile server. In addition, a Device 12 may be a "hardware" device, such as a processor, printer or server, or a "software" device, such as a word processing program, Internet browser and server programs, or an interface driver.

Lastly, it is assumed in the following descriptions of the present invention that the feature correlation and matching mechanism of the present invention communicates among the Devices 12 of a System 10 through an existing protocol shared among the Devices 12 that are to embody the present invention, that is, that the protocol is extended to include features supporting the mechanisms and operations of the present invention. As will be described subsequently, other implementations may be constructed that do not require extensions or additions to the protocols, which may be industry standard protocols and thus difficult to modify for any purpose that is not also an accepted industry standard practice.

B. Description of a Device 12 as a Requesting Device (FIGS. 1 and 2)

Figure 2:
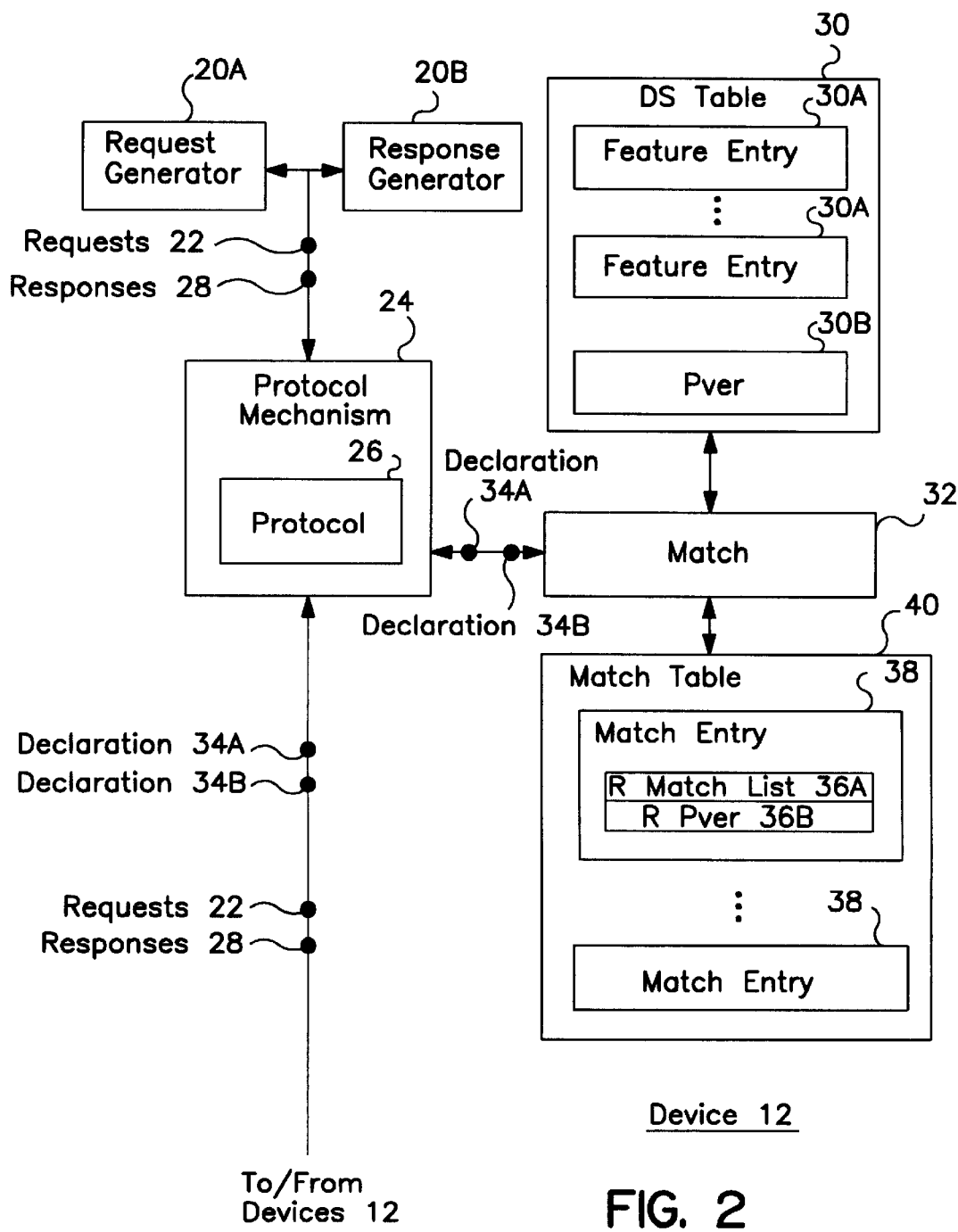
FIG. 2 is a block diagram of a requesting device incorporating the present invention.

Referring to FIGS. 1 and 2 and first considering the structure and operation of a Device 12 as a Requesting Device 12A, including a Bilateral Device 12C as a requesting Device 12, each Requesting Device 12A will typically support a Feature Set 16 that will include a subset of Features 18 wherein Features 18 include all features that are or may be supported by Devices 12 and the protocol through which Devices 12 communicate. A Feature Set 16 may include all of Features 18 or only a part of Features 18 and the Feature Sets 16 of Requesting Devices 12A may overlap to any degree. That is, the Feature Sets 16 of two or more Requesting Devices 12A may include identical sets of Features 18, or may have no Features 18 in common, or one may support one or more Features 18 that another does not.

Each Requesting Device 12A will include a Function Unit 20 for performing the functions and operations of the Device 12 wherein Function Unit 20 will be the source of Requests 22 for the performance or provision of Features 18 by other Devices 12. Each Requesting Device 12A will also include a Protocol Mechanism 24 that executes a Protocol 26 to communicate Requests 22 for Features 18 to others of Devices 12, such as a Responding Device 12B, and to receive Responses 28 from the other Devices 12 according to the Protocol 26, the Responses 28 being communicated to Function Unit 20 by Protocol Mechanism 24 for action by the Function Unit 20 as is appropriate. As described, a Function Unit 20 may be any source of a request for an operation or function to be performed or provided by another Device 12, such as a word processing program requesting a file from a file server or that a document be printed, an email program forwarding an email message to a recipient, a facsimile receiver/server forwarding a facsimile document to be stored or printed, and so on. A Protocol 26, in turn, is, as described, a communication language designed for inter-device communication with respect to the tasks, functions or operations to be requested or performed by the Devices 12 and includes the commands, responses and information formats necessary to support the Features 18 that are the subject of Requests 22 and Responses 28. In this respect, it should be noted that while a Requesting Device 12A will typically support one Protocol 26, and usually one version of that Protocol 26, a Request Generator 12A may support and execute more than one Protocol 26, or more than one version of a given Protocol 26. In such cases, Protocol Mechanism 24 will either be of a design to support multiple Protocols 26 or the Requesting Device 12A may include multiple Protocol Mechanisms 24.

As shown, and according to the present invention, a Requesting Device 12A includes a Device Supported Features Table (DS Table) 30, which essentially stores one or more Feature Entries 30A wherein each Feature Entry 30A designates a Feature 18 supported by that Device 12A, so that a DS Table 30 is essentially a listing of the Features 18 supported by that Device 12A. As illustrated in FIG. 1, and for example, a first Device 12 may support Features 18A, 18C and 18F, a second Device 12 may support Features 18A, 18B and 18C, a third Device 12 may support Features 18A, 18C and 18D, and so on, and similarly for all Devices 12. As indicated, DS Table 30 may also store a Device Supported Protocol Version (PVer) 30B designating the version of Protocol 26 currently being used by that Device 12A. In those instances wherein a Requesting Device 12A supports more than one Protocol 26 or more than one version of a Protocol 26, the Requesting Device 12A may contain a plurality of DS Tables 30, the number of DS Tables 30 depending upon the number of Protocols 26 and versions of a Protocol 26 supported by the Requesting Device 12A and whether certain Protocols 26 or versions of Protocols 26 a functionally identical and thus can share a DS Table 30. Alternately, all Protocols 26 or versions of a Protocol 26 that are supported by a Requesting Device 12A may be accommodated within the Feature Entries 30A of a single DS Table 30 by associating a PVer 30B with each Feature Entry 30A.

Each Requesting Device 12A further includes a Feature Match Mechanism (Match) 32, which may, for example, be a part of Protocol Mechanism 24 or a separate mechanism associated with Protocol Mechanism 24, that operates with Protocol Mechanism 24 and DS Table 30 to establish which Features 18 are supported in common by the Requesting Device 12A and other Devices 12 accessible to the Requesting Device 12A. Upon initialization of the Requesting Device 12A, which may occur, for example, at initialization of System 10 or of the Requesting Device 12A, or upon receiving an initialization message from another Device 12, Match 32 will operate through Protocol Mechanism 24 generate at least one Own Features Declaration (Declaration) 34A. A Declaration 34A contains information extracted from the DS Table 30 or DS Tables 30 identifying the Features 18 supported by the Requesting Device 12A, such as Match Entries 38, may contain information identifying a Protocol 26 and version of Protocol 26 supported by the Requesting Device 12A, such as PVer 30, and may contain an identification of the Requesting Device 12A generating the Declaration 34A.

In those implementations wherein the Requesting Device 12A supports one Protocol 26, and one version of the Protocol 26, Match 32 will generate a single Declaration 34A that contains supported Features 18 information from the DS Table 30 and that may contain, for example, the PVer 30A from the DS Table 30. In those implementations wherein a Requesting Device 12A supports more than one Protocol 26, or more than one version of a Protocol 26, Match 32 may generate a Declaration 34A for and corresponding to each Protocol 26 or version of a Protocol 26 supported by the Requesting Device 12A. In this instance, each Declaration 34A will identify the corresponding Protocol 26 or version of the Protocol 26 and the Features 18 supported by the Requesting Device 12A for that Protocol 26 or version of a Protocol 26. In an alternative embodiment, the Match 32 may generate a single, combined Declaration 34A identifying each Protocol 26 or version of a Protocol 26 supported by the Requesting Device 12A and the Features 18 supported by the Requesting Device 12A for each. In yet another embodiment, Match 32 may generate Declarations 34A for each of groups of related Protocols 26 or the versions of a Protocol 26.

The Declaration 34A or Declarations 34A will be transmitted by the Requesting Device 12A to other Devices 12, usually by means of Protocol Mechanism 24 and the Protocols 26 appropriate to the contents of the Declaration 34A or Declarations 34A and using a version of the Protocol 26 supported by the Requesting Device 12A. As will be described further in the following, the Devices 12 that are capable of operating as a Responding Device 12B with respect to the Requesting Device 12A, including Bilateral Devices 12C, will respond to a Declaration 34A with a Own Features Declaration (Declaration) 34B identifying the Features 18 that are supported by the Responding Device 12A and that match the Features 18 supported by the Requesting Device 12A issuing the Declaration 34A. Each Declaration 34B will contain a Respondent Matching Features List (RMatch List) 36A containing identifications of the Features 18 that are supported by the Responding Device 12 and that match the Features 18 supported by the Requesting Device 12A for the Protocol 26 or version of a Protocol 26 identified in the Declaration 34A. A Declaration 34B may also contain an identification of the Device 12 generating the Declaration 34B, and may also contain a Respondent Protocol Version (RPVer) 36B identifying the Protocol 26 and version of Protocol 26 currently being used by the Device 12 providing the Declaration 34B.

It should be noted that the form of a Declaration 34B will depend upon the form of the Declaration 34A or Declarations 34A issued by the Requesting Device 12A and upon the design and nature of the responding Device 12. That is, in instances wherein the Requesting Device 12A supports a single Protocol 26 and a single version of the Protocol 26, and accordingly issues a single Declaration 34A, the responding Device 12 will generate a single Declaration 34B identifying the Features 18 that are mutually supported by the Requesting Device 12A and the responding Device 12 for the Protocol 26 or version of Protocol 26 identified in the Declaration 34A. In those instances wherein the Requesting Device 12A supports multiple Protocols 26 or multiple versions of a Protocol 26 and issues multiple Declarations 34A of any form, as described above, a Responding Device 12B may respond with a single, combined Declaration 34B or with multiple Declarations 34B, as described with regard to Declarations 34A above.

Upon receiving one or more Declarations 34B by means of Protocol 26 and Protocol Mechanism 24, the Match 32 of the Requesting Device 12A will write the contents of each Declaration 34B into a Match Entry 38 of a Match Table 40, so that Match Table 40 will contain a Match Entry 38 for and corresponding to each Device 12 with which the Requesting Device 12A may communicate. Each Match Entry 38 contains identifications of each of the Features 18 that are supported by the responding Device 12 and that match the Features 18 supported by the Requesting Device 12A, such as an RMatch List 36A from the Declaration 34B, may include an identification of the Device 12 providing the corresponding Declaration 34B, and may include a RPVer 36B identifying the version of Protocol 26 in use by the responding Device 12. To illustrate by example, it was described in an example above that a first Requesting Device 12A may support Features 18A, 18C and 18F, a second Requesting Device 12A may support Features 18A, 18B and 18C, and a third Requesting Device 12A may support Features 18A, 18C and 18D. Assuming that each of these Requesting Devices 12A is to communicate with a Device 12, which may be, for example, a Responding Device 12B or a Bilateral Device 12C, the Match Table 40 of each of the Requesting Devices 12A will contain a Match Entry 38 for and corresponding to that Device 12. If, for example, that Device 12 supported Features 18A, 18C, 18D, 18E and 18F, the Match Entry 38 for the first Requesting Device 12A would identify matches for Features 18A, 18C and 18F, that of the second Requesting Device 12A would identify matches for Features 18A and 18C, and that of the third Requesting Device 12A would identify matches for Features 18A, 18C and 18D. It should be noted that, as described below, a Responding Device 12B or Bilateral Device 12C may support multiple Protocols 26 or multiple versions of a Protocol 26 and may accordingly provide multiple Declarations 34B in response to a Declaration 34A, or may incorporate the Declaration 34B information for each Protocol 26 or version of a Protocol 26 into a single, combined Declaration 34B. In either case, the Match 32 of the Requesting Device 12A will extract the Match Entry 38 information for each Protocol 26 or version of a Protocol 26 from the individual Declarations 34B or the combined Declaration 34B and will construct Match Entries 38 accordingly. In this regard, it should be noted that a given Match Entry 38 may be shared among several Devices 12 with which the Requesting Device 12A is to communicate if the corresponding Protocols 26 or versions of a Protocol 26 are functionally similar as regards the supported Features 18.

Having constructed a Match Table 40 having one or more Match Entries 38 for and corresponding to each other Device 12 with which the Requesting Device 12A is to communicate, the Match 32 of a Requesting Device 12A will thereafter monitor each Request 22 generated by its Function Unit 20 to one or those Devices 12, for example, by intercepting or capturing each Request 22, and will identify the Device 12 to which the Request 22 is directed and the Feature 18 identified in the Request 22. Match 32 will read the Match Entry 38 of Match Table 40 corresponding to the Device 12 to which the Request 22 is directed and will compare the requested Feature 18 with the Features 18 supported by the Device 12 to which the Request 22 is directed. This comparison will typically include the version or versions of the Protocols 26 supported by the Requesting Device 12A and the Device 12 to which the Request 22 is directed if either the Requesting Device 12A or the Device 12 to which the Request 22 is directed supports multiple versions of the Protocol 26 in which the Request 22 is to be transmitted. If the Device 12 supports the requested Feature 18, Match 32 will allow Protocol Mechanism 24 to communicate the Request 22 to the Device 12. If the Device 12 does not support the requested Feature 18, Match 32 may terminate the Request 22 and send an appropriate message to the Function Unit 20 that the requested Feature 18 is not available through that Device 12. In further embodiments of the present invention, and upon detecting that the Device 12 to which a Request 22 is directed does not support the requested Feature 18, Match 32 may search Match Entries 38 to identify a Device 12 that supports the requested Feature 18. Match 32 may then generate a message to Function Unit 20 identifying the Device 12 supporting the requested Feature 18, so that Function Unit 20 can generate a Request 22 directed to the Device 12 supporting the Feature 18, or Match 32 may redirect the Request 22 to that Device 12 and generate a message to Function Unit 20 that the Request 22 has been redirected to the Device 12 supporting the Feature 18.

C. Description of a Device as a Responding Device (FIGS. 1 and 2)

Referring to FIGS. 1 and 2 and considering the structure and operation of a Device 12 as a Responding Device 12B, including Bilateral Devices 12C functioning as Responding Devices 12B, a Responding Device 12B is generally similar to a Requesting Device 12A and includes a Function Unit 20 for performing the functions or operations of each Request 22 directed to the Responding Device 12B for a Feature 18 supported by the Responding Device 12B, and for generating appropriate Responses 28 to Requests 22. In this regard, it will be understood that the Function Unit 20 of a given Responding Device 12B may, like the Function Unit 20 of a Requesting Device 12A, be a "hardware" element, such as a modem, or a "software" element, such as a program executing on a processor. It will also be understood that a Function Unit 20 may be essentially the same type of device as the Function Unit 20 with which it is communicating, such as two file servers exchanging or correlating files. In other instances, the Function Unit 20 may be a complementary or mirror device with respect to the Function Unit 20, such as an Internet file server communicating with a browser program. In yet other instances, the Function Unit 20 and the Function Unit 20 may be completely different types of devices, such as a printer device serving a word processing or graphic program or a facsimile server.

As shown, each Responding Device 12B also includes a Protocol Mechanism 24 to execute at least one version of at least Protocol 26 and a Device Supported Features Table (DS Table) 30 storing one or more Feature Entries 30A, each of which designates a Feature 18 supported by the Responding Device 12B. Again, a given Responsing Device 12B may support some or all or none of the Features 18 supported by a given Requesting Device 12 A. As described, DS Table 30 may also include a Device Supported Protocol Version (PVer) 30B designating the version of Protocol 26 currently being used by that Responding Device 12B in support of the Features 18 designated in the DS Table 30. Again, a Responding Device 12B may support multiple Protocols 26 or multiple versions of a Protocol 26 and, if so, the Protocol Mechanism 24 and DS Table 30 or DS Tables 30 of the Responding Device 12B will be adapted accordingly, as described above with respect to a Requesting Device 12A. As described, the PVer 30B of each DS Table 30 may be transmitted in a Declaration 34B as Respondent Protocol Version (RPVer) 36B for that Responding Device 12B for the Features 18 designated in the corresponding DS Table 30.

Each Responding Device also includes a Feature Match Mechanism (Match) 32, which again, and for example, may be a part of Protocol Mechanism 24 or a separate mechanism associated with Protocol Mechanism 24. The Match 32 of a Responding Device 12B operates with Protocol Mechanism 24 and the DS Table 30 or DS Tables 30 upon receiving a Declaration 34A from a Device 12 to compare the Features 18 supported by the Device 12 as defined in the Declaration 34A with the Features 18 supported by the Responding Device 12B as listed in the DS Table 30 or DS Tables 30 of the Responding Device 12B for a given Protocol 26 or version of a Protocol 26. In this respect, the Protocol 26 or version of a Protocol 26 for which mutually supported Features 18 are to be identified may be determined by the Match 32 from the Protocol 26 and version of the Protocol 26 in which the Declaration 34A was received, or from PVer 30B information contained in the Declaration 34A. Having established which Features 18 are supported in common by the Requesting Device 12A and the Responding Device 12B for the identified Protocol 26 or version of a Protocol 26, the Match 32 of the Responding Device 12B will generate a corresponding Declaration 34B or Declarations 34B to the Device 12 generating the Declaration 34A, as described above. In those embodiments wherein the Responding Device 12B supports a single Protocol 26, or wherein only one Protocol 26 is suitable for the Declaration 34B, the Declaration 34B will, as described, include a Respondent Matching Features List (RMatch List) 36A containing identifications of the Features 18 that are supported by the Responding Device 12B and that match the Features 18 supported by the Requesting Device 12A issuing the Declaration 34A. The Declaration 34B may also include an identification of the Responding Device 12B and a Respondent Protocol Version (RPVer) 36B identifying the Protocol 26 and the version of the Protocol 26 currently being used by the Responding Device 12B. In those instance wherein the Responding Device 12B supports multiple Protocols 26 or multiple versions of a Protocol 26, the Responding Device 12B may generate a Declaration 34B for each Protocol 26 or version of a Protocol 26 supported by the Responding Device 12B, or a Declaration 34B for each of one or more groups of related Protocols 26 or versions of a Protocol 26. Alternately, the Responding Device 12B may incorporate the Declaration 34B information for each Protocol 26 or version of a Protocol 26 into a single, combined Declaration 34B.

A Responding Device 12B will thereby be initialized with respect to a Device 12 from which may receive Requests 22 for Features 18 by receiving a Declaration 34A from the Device 12 and providing a corresponding Declaration 34B to the Device 12. In this regard, it will be recognized that a Responding Device 12B may be initialized with respect to a given Device 12 at any time, such as when a Device 12 is added to or is otherwise activated in System 10, so that the group of Devices 12 supported by a given Responding Device 12B may change over time. Once initialized with respect to a given Device 12, a Responding Device 12B will respond to Requests 22 for Features 18 from the Device 12 by performing or providing the functions or operations of the requested Features 18. As described with respect to Requesting Devices 12A, the feature correlation and matching mechanism of the present invention operates so that a Requesting Device 12A should not submit a Request 22 to a Responding Device 12B for a Feature 18 that is not supported by both the Requesting Device 12A and the Responding Device 12B, or in a Protocol 26 or version of Protocol 26 that is not supported by the Requesting Device 12A and the Responding Device 12B for the requested Feature 18.

D. Description of a Device 12 as a Bilateral (Requesting and Responding) Device (FIGS. 1 and 2)

As described herein above, Devices 12 are typically capable of operating as both Requesting Devices 12A and as Responding Devices 12B. For example, devices such as workstations, processors, personal computers, file servers, print servers, paper handling controllers that serve one or more clients by controlling one or more printers or other paper handling devices, and system communications node devices, are required to operate as both requesting and responding devices in supporting the features that they provide.

For this reason, and as illustrated in FIGS. 1 and 2, a Bilateral Device 12C again includes a Function Unit 20 for generating Requests 22 for mutually supported Features 18 to other Devices 12 and for performing the functions or operations of each Request 22 for a mutually supported Feature 18 directed to the Bilateral Device 12C by other Devices 12. Again, the Function Unit 20 may be a "hardware" element or a "software" element and the Function Unit 20 may be the same type of device, or a complementary or mirror device, or completely a different type of device elements with respect to the Function Unit 20 which it is communicating in other Devices 12.

Each Bilateral Device 12C again includes a Protocol Mechanism 24 or Protocol Mechanism 24 to execute corresponding Protocols 26, wherein the number, type and versions of Protocols 26 supported by a Bilateral Device 12C will depend upon the protocols required to communicate with the other Devices 12 with which the Bilateral Device 12C is required to communicate. For example, a Bilateral Device 12C operating as a paper handling controller to control a printer complex or node for a system is required to communicate both with Devices 12 generating Requests 22 for the printing of documents, such as workstations or fax or email servers, and with other Devices 12 that carry out the actual paper handling operations, such as printers. The paper handling Bilateral Device 12C may communicate with both the Devices 12 issuing the print requests and the Devices 12 executing the print requests through a single paper handling protocol, or may be required to communicate with the different types of Devices 12 through separate protocols.

A Bilateral Device 12C will also contain one or more Device Supported Features Tables (DS Tables) 30 wherein each DS Table 30 corresponds to a Protocol 26 or a version of a Protocol 26 in which the Bilateral Device 12C may communicate with another Device 12, as described above. Again, each DS Table 30 stores one or more Feature Entries 30A wherein each Feature Entry 30A designates a Feature 18 supported by the Bilateral Device 12C in the corresponding Protocol 26 or version of a Protocol 26. Again, a given Bilateral Device 12C may support some or all or none of the Features 18 supported by another Requesting Device 12A, Responding Device 12B or Bilateral Device 12C. A Bilateral Device 12C may also include a Device Supported Protocol Version (PVer) 30B designating the Protocol 26 or version of the corresponding Protocol 26 currently supported by the Bilateral Device 12C for the Features 18 of that Feature 18A. Again, the PVer 30B may be transmitted in Declaration 34B to a Declaration 34A as Respondent Protocol Version (RPVer) 36B for the Bilateral Device 12C.

Each Bilateral Device 12C also includes a Feature Match Mechanism (Match) 32, which again, and for example, may be a part of Protocol Mechanism 24 or a separate mechanism associated with Protocol Mechanism 24. As described, the Match 32 of a Bilateral Device 12C operates with Protocol Mechanisms 24 and DS Tables 30 upon receiving a Declaration 34A from a Device 12 by comparing the Features 18 supported by the Device 12, as defined in the Declaration 34A, with the Features 18 supported by the Bilateral Device 12C, as listed in the corresponding DS Table 30 of the Bilateral Device 12C for a Protocol 26 or a version of a Protocol 26. Having established which Features 18 are supported in common by the Device 12 and the Bilateral Device 12C, the Match 32 will generate a corresponding Declaration 34B to the Device 12 that is the source of the Declaration 34A, as described above. As also described above, a Declaration 34B will include a Respondent Matching Features List (RMatch List) 36A containing identifications of the Features 18 that are mutually supported by the Bilateral Device 12C and the Device 12 issuing the Declaration 34A, and may include a Respondent Protocol Version (RPVer) 36B identifying the version of Protocol 26 currently used by the Bilateral Device 12C for those Features 18. As described with respect to Requesting Devices 12A, a Device 12 receiving a Declaration 34B to a Declaration 34A from a Bilateral Device 12C will store the information contained in the Declaration 34B in a Match Table 40 and will check all Requests 22 to the Bilateral Device 12C that provided the Declaration 34B against the corresponding entries in the Match Table 40, so that the Device 12 will not submit a Request 22 to the Bilateral Device 12 for a Feature 18 that is not mutually supported by the Device 12 and the Bilateral Device 12C.

As described, a Bilateral Device 12C may be required to generate Requests 22 to other Devices 12 and, for these purposes, the Match 32 of the Bilateral Device 12C will generate one or more Declarations 34A to the Devices 12 to which it may issue Requests 22, as described above with regard to Requesting Devices 12A, and will construct a Match Table 40 containing a Match Entry 38 for and corresponding to each Device 12 from which the Bilateral Device 12C receives a Declaration 34B. As described, each Match Entry 38 contains identifications of each of the Features 18 that are supported in common by the Bilateral Device 12C and the corresponding Device 12 to which it may issue a Request 22, and may include a PVer 30B identifying the version of the Protocol 26 currently used by the corresponding Device 12. As described, a Bilateral Device 12C may support multiple Protocols 26 or multiple versions of a Protocol 26 and may accordingly generate multiple Declarations 34A and receive multiple Declarations 34B, or may incorporate the Declaration 34A information for each Protocol 26 or version of a Protocol 26 into a single, combined Declaration 34A and may receive a single Declaration 34B from a given Device 12. In either case, the Match 32 of the Requesting Device 12A will extract the Match Entry 38 information for each Protocol 26 or version of a Protocol 26 from the individual Declarations 34B or the combined Declaration 34B and will construct Match Entries 38 accordingly. Again, a given Match Entry 38 may be shared among several Devices 12 with which the Requesting Device 12A is to communicate if the corresponding Protocols 26 or versions of a Protocol 26 are functionally similar as regards the supported Features 18.

A Bilateral Device 12C will thereby be initialized with respect to each Device 12 to which it may issue a Request 12 for a Feature 18 by transmitting one or more Declarations 34A to each such Device 12, receiving one or more corresponding Declarations 34B, and constructing a Match Table 40. A Bilateral Device 12C may be initialized with respect to a given Device 12 at any time, for example, when a Device 12 is added to or is otherwise activated in System 10, so that the group of Device 12 supported by a given Bilateral Device 12C may change over time.

Once initialized with respect to a given Device 12, the Function Unit 20 of a Bilateral Device 12C may generate Requests 22 for Features 18 to the Device 12. When the Function Unit 20 generates a Request 22 to a Device 12, the Match 32 of the Bilateral Device 12C will intercept or capture the Request 22 generated by the Function Unit 20 and will determine the Device 12 to which the Request 22 is directed and the Feature 18 identified in the Request 22. The Match 32 will then read the Match Entry 38 of Match Table 40 corresponding to the Device 12 the Request 22 is direct to, and will compare the requested Feature 18 with the Features 18 supported in common by the Bilateral Device 12C and the Device 12 to which the Request 22 is directed. If the Device 12 supports the requested Feature 18, Match 32 will allow Protocol Mechanism 24 to communicate the Request 22 to the Device 12. If the Device 12 does not support the requested Feature 18, Match 32 will terminate the Request 22 and send an appropriate message to the Function Unit 20 that the requested Feature 18 is not available through that Device 12. In further embodiments of the present invention, and upon detecting that the Device 12 that a Request 22 is directed to does not support the requested Feature 18, Match 32 may search Match Entries 38 to identify a Device 12 that supports the requested Feature 18. Match 32 may then generate a message to Function Unit 20 identifying the Device 12 supporting the requested Feature 18, so that Function Unit 20 can generate a Request 22 directed to the Device 12 supporting the Feature 18, or Match 32 may redirect the Request 22 to that Device 12 and generate a message to Function Unit 20 that the Request 22 has been redirected to the Device 12 supporting the Feature 18.

E. Summary and Alternate Embodiments

In summary, the present invention provides a mechanism and method for correlating and matching mutually supported features of system devices using a protocol to communicate requests and responses for the features. As described, a first device communicates a list of the features supported by the first device to a second device with which it is to communicate regarding the features, the second device determines the features supported in common by the first and second devices and informs the first device of the features that are supported in common by the devices. The first device then uses the information received from the second device regarding mutually supported features in generating requests for features to the second device, so that the first device requests only those features that are supported in common by the two devices.

It will be apparent that the present invention offers a number of advantages over the methods of the prior art. For example, a device is not required to support all features of a protocol but may support only those features necessary to the device, thereby allowing the construction of simpler and less expensive devices. Alternately, a device may be designed to support multiple protocols or multiple versions of a protocol, but all communication between that device and other devices will be only in the protocol or protocol version mutually supported by the devices, thereby reducing incompatibility and errors between the devices. In addition, the errors or inability to communicate arising between devices that support different versions of a protocol are reduced as the devices may be able to determine features that are supported in common in the different versions of the protocol, thereby avoiding operational errors due to features that are not mutually supported and establishing at least partial communication and mutual support of some features.

It will be appreciated by those of ordinary skill in the relevant arts that there may be a range of alternate embodiments of the present invention without departing from the essential principles of the present invention, certain of which have been discussed herein above. For example, it is assumed in the above descriptions of the present invention that the feature correlation and matching mechanism of the present invention communicates among the Devices 12 through a Protocol 26 shared among the Devices 12. That is, that the Features 18 of a Protocol 26 supported by the Devices 12 in which the present invention is to be implemented are extended by the addition of one or more Features 18 supporting the operation of the feature correlation and matching mechanisms of the present invention. In other embodiments, however, a dedicated purpose Protocol 26 may be developed for this purpose, which may be system specific or eventually developed as an industry standard protocol for use across a variety of systems and Protocol Mechanisms 24 augmented to execute the feature matching protocol. In yet another example, it will be recognized that it is not necessary to communicate protocol version information in many implementations of the feature matching mechanisms of the present invention, but only information regarding the Features 18 mutually supported by the Devices 12. This situation may arise, for example, in those instances wherein the devices use the same version of a protocol or when the implementation of a feature is not dependent upon the version of a protocol, that is, when the features of a protocol are executed in the same manner across all version of a protocol and only the features that are supported change across versions of the protocol. In further example, the exchange of protocol information may not be required in instances wherein the version differences are not significant to the operation of the feature matching mechanisms of the present invention as implemented in a given system or wherein the feature matching mechanisms of the present invention are otherwise implemented to not require protocol version information, as when a lack of response due to non-support of a protocol is accepted as a response indicating that the features are, in effect, not supported.

Also, it has been described above that a device will issue a declaration stating the features supported by the device and will receive declarations from other devices stating the features that they support in common with the device issuing the declaration, thereafter constructing entries in a matching features table to store information identifying the features supported in common with each other device. In an alternate embodiment of Requesting Devices 12A, Responding Devices 12B or Bilateral Devices 12C as illustrated in FIG. 2 and as described above, each Device 12 may broadcast to all other Devices 12 a Declaration 34A containing a statement of the features supported by the device as described above with respect to Declarations 34A. That is, and for example, the broadcast Declaration 34A would contain Features Entries 30A and may include protocol version information if necessary or desired, such as PVer 30B. Each Device 12 would correspondingly receive similar broadcast Declarations 34A from other Devices 12 of the system, each identifying the Features 18 and version of a Protocol 26 supported by the Device 12 broadcasting the Declaration 34A. Each Device 12 would then construct a Match Table 40 containing Match Entries 38 for and corresponding to the Declarations 34A received from other Devices 12 by comparing the Features 18 and Protocol 26 versions identified in the broadcast Declarations 34A from other Devices 12 with the Features 18 and Protocol 26 version supported by the Device 12 as identified in the Device 12's DS Table 30, thereby determining the Features 18 that are mutually supported between that Device 12 and each other Device 12 of the system. It will be appreciated that this implementation requires only that each Device 12 broadcast a Declaration 34A and receive similar broadcast Declarations 34A from other devices, and does not require the two stage, bilateral communication of a Declaration 34A and Declaration 34B for each other device in the system. It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. A feature matching method, comprising:
   receiving a declaration identifying a first protocol and first features for the first protocol and a second protocol and second features for the second protocol, the first and second features being supported by a first device;
   identifying, for a third protocol, third features supported by a second device;
   identifying a compatible protocol, the compatible protocol being whichever of the first or second protocols that is compatible with the third protocol; and
   comparing the features for the compatible protocol with the third features to identify features supported in common by the first device and the second device.

2. The method of claim 1, further comprising generating a reply declaration identifying the compatible protocol and the features supported in common by the first device and the second device and sending the reply declaration to the first device.

3. The method of claim 1 wherein receiving the declaration comprises receiving a first declaration and a second declaration, the first declaration identifying the first protocol and the first features for the first protocol, and the second declaration identifying the second protocol and the second features for the second protocol.

4. The method of claim 1, further comprising monitoring a request for a feature that is directed from the second device to the first device to determine whether a feature identified in that request is supported by the second device as indicated by the comparison.

5. A feature matching method, comprising:

sending a declaration to a first device, the declaration identifying a first protocol and first features for the first protocol and a second protocol and second features for the second protocol, the first and second features being supported by a second device;

receiving a reply declaration identifying a compatible protocol and third features for the compatible protocol, the compatible protocol being a protocol that is compatible with the first protocol or the second protocol, the third features being features supported in common by the first device and the second device for the compatible protocol;

monitoring a request for a feature that is directed from the second device to the first device to determine whether a feature identified in that request is supported by the first device as indicated by the reply declaration.

6. The method of claim 5, wherein sending a declaration comprises sending a first declaration and a second declaration, the first declaration identifying the first protocol and the first features for the first protocol, and the second declaration identifying the second protocol and the second features for the second protocol.

7. A computer readable medium having instructions for;

receiving a declaration identifying a first protocol and first features for the first protocol and a second protocol and second features for the second protocol, the first and second features being supported by a first device;

identifying, for a third protocol, third features supported by a second device;

identifying a compatible protocol, the compatible protocol being whichever of the first or second protocols that is compatible with the third protocol; and comparing the features for the compatible protocol with the third features to identify features supported in common by the first device and the second device.

8. The medium of claim 7, having further instructions for generating a reply declaration identifying the compatible protocol and the features supported in common by the first device and the second device and sending the reply declaration to the first device.

9. The medium of claim 7 wherein the instructions for receiving the declaration include instructions for receiving a first declaration and a second declaration, the first declaration identifying the first protocol and the first features for the first protocol, and the second declaration identifying the second protocol and the second features for the second protocol.

10. The medium of claim 7, having further instructions for monitoring a request for a feature that is directed from the second device to the first device to determine whether a feature identified in that request is supported by the second device as indicated by the comparison.

11. A computer readable medium having instructions for:

sending a declaration to a first device, the declaration identifying a first protocol and first features for the first protocol and a second protocol and second features for the second protocol, the first and second features being supported by a second device;

receiving a reply declaration identifying a compatible protocol and third features for the compatible protocol, the compatible protocol being a protocol that is compatible with the first protocol or the second protocol, the third features being features supported in common by the first device and the second device for the compatible protocol;

monitoring a request for a feature that is directed from the second device to the first device to determine whether a feature identified in that request is supported by the first device as indicated by the reply declaration.

12. The medium of claim 11, wherein the instructions for sending a declaration include instructions for sending a first declaration and a second declaration, the first declaration identifying the first protocol and the first features for the first protocol, and the second declaration identifying the second protocol and the second features for the second protocol.

13. A feature matching system, comprising:

a protocol mechanism operable to receive a declaration identifying a first protocol and first features for the first protocol and a second protocol and second features for the second protocol, the first and second features being supported by a first device;

a features table identifying third features for a third protocol supported by a second device; and a first match mechanism operable to identify a compatible protocol, the compatible protocol being whichever of the first or second protocols that is compatible with the third protocol, to compare the features for the compatible protocol identified in the first declaration with the third features to identify features supported in common by the first device and the second device.

14. The system of claim 13, wherein the match mechanism is further operable to generate a reply declaration identifying the compatible protocol and the features supported in common by the first device and the second device and wherein the protocol mechanism is further operable to send the reply declaration to the first device.

15. The system of claim 13, wherein the protocol mechanism is operable to receive the declaration in the form of a first declaration and a second declaration, the first declaration identifying the first protocol and the first features for the first protocol, and the second declaration identifying the second protocol and the second features for the second protocol.

* * * * *